O. E. DROEGE & G. A. ROBINSON.
EXPANSION SOCKET OR PLUG.
APPLICATION FILED OCT. 29, 1918.

1,296,374.

Patented Mar. 4, 1919.

WITNESSES

INVENTORS
Oscar E. Droege.
George A. Robinson.
BY
ATTORNEYS

UNITED STATES PATENT OFFICE.

OSCAR E. DROEGE, OF POMPTON LAKES, NEW JERSEY, AND GEORGE A. ROBINSON, OF NEW YORK, N. Y.

EXPANSION SOCKET OR PLUG.

1,296,374.  Specification of Letters Patent.  Patented Mar. 4, 1919.

Application filed October 29, 1918. Serial No. 260,189.

*To all whom it may concern:*

Be it known that we, OSCAR E. DROEGE, a citizen of the United States, and a resident of Pompton Lakes, in the county of Passaic and State of New Jersey, and GEORGE A. ROBINSON, a citizen of the United States, and a resident of the city of New York, borough of Manhattan, in the county and State of New York, have invented a new and Improved Expansion Socket or Plug, of which the following is a full, clear, and exact description.

The object of the invention is to provide a new and improved expansion socket or plug for securely anchoring screws or bolts in place in holes drilled or otherwise produced in the wall of a building or other structure. Another object is to prevent the socket or plug from shifting or passing too far into or entirely through the hole in the wall or other structure. Another object is to provide a socket or plug of exceedingly simple construction and one that can be readily placed in position without the aid of skilled labor.

With these and other objects in view, the invention consists of certain novel features of construction, as hereinafter shown and described and then specifically pointed out in the claim.

A practical embodiment of the invention is represented in the accompanying drawings forming a part of this specification, in which similar characters of reference indicate corresponding parts in all the views.

Figure 1:
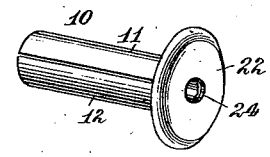
Figure 1 is a perspective view of the body of the improved socket or plug.
Figure 2:
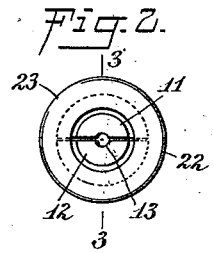
Fig. 2 is a rear end elevation of the same.
Figure 3:
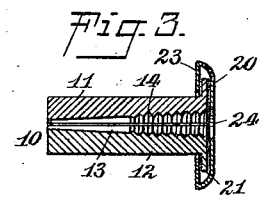
Fig. 3 is a longitudinal central section of the same on the line 3—3 of Fig. 2.
Figure 4:
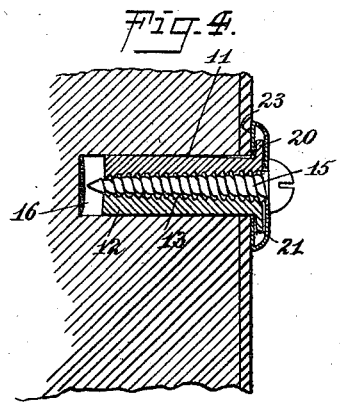
Fig. 4 is a longitudinal central section of the socket or plug anchored in place in a hole in a wall.

The body 10 of the expansion socket or plug is preferably made cylindrical and of a soft material such as lead, and the said body 10 is preferably made in two longitudinal sections 11 and 12 forming between them a central conical bore 13, the front portion 14 of which is threaded as indicated in Fig. 3. A screw or bolt 15 screws in the threaded portion 14 and in advancing in the bore 13 it cuts its own thread in the material of the body sections 11 and 12 and expands the said sections against the wall of the hole 16 of a diameter slightly in excess of that of the body 10.

The outer ends of the body sections 11 and 12 are provided with semicircular flanges 20, 21 inclosed in a cap 22 having a back flange 23 spun or otherwise formed around the flanges 20 and 21 so as to hold the sections 11 and 12 together and thereby prevent such sections from becoming lost. The cap 22 is provided with a central opening 24 in register with the bore 13 for the passage of the screw or bolt 15 to be anchored in place by the socket, as above described.

It will be noticed that by the arrangement described the body 10 can be readily inserted in a hole 16 in the wall, and then the operator can readily screw the bolt or screw 15 in position to expand the sections 11 and 12 against the wall of the hole 16. It will further be noticed that by the arrangement described, the flanges 20 and 21 and the cap 22 prevent the body from passing too far into the hole 16 especially as the flange 23 of the cap 22 abuts against the face of the wall or other structure on which the expansion socket or plug is used. It is understood that the part to be fastened in place can be clamped either between the face of the wall and the cap 22 or between the cap and the head of the screw or bolt 15.

The socket or plug shown and described is very simple in construction and one that can be readily placed in position without the aid of skilled labor.

Having thus described our invention, we claim as new and desire to secure by Letters Patent:—

An expansion socket or plug, comprising a body made of soft material approximately of cylindrical shape, the body being formed of longitudinal sections having a conical bore, the front end of which is partly threaded, and a threaded expanding member screwing into the said threaded bore to expand the body against the wall of a hole.

OSCAR E. DROEGE.
GEORGE A. ROBINSON.